United States Patent [19]

Bechthold

[11] 4,235,675
[45] Nov. 25, 1980

[54] PROCESS FOR PURIFYING PYROLYSIS GASES

[75] Inventor: Horst Bechthold, Erftstadt-Friesheim, Fed. Rep. of Germany

[73] Assignee: Ealther & Cie Aktiengesellschaft, Köln-Dellbrück, Fed. Rep. of Germany

[21] Appl. No.: 908,287

[22] Filed: May 22, 1978

[30] Foreign Application Priority Data

May 20, 1977 [DE] Fed. Rep. of Germany ....... 2722767

[51] Int. Cl.$^2$ .................. C10B 51/00; B01D 53/02; B01D 53/14
[52] U.S. Cl. .................................. 201/2.5; 48/209; 55/73; 55/74; 201/25; 201/27; 201/29
[58] Field of Search ............... 48/209; 55/68, 73, 74; 110/229, 230, 276; 201/2.5, 25, 27, 29; 431/162, 164–167, 215

[56] References Cited

U.S. PATENT DOCUMENTS

| | | | |
|---|---|---|---|
| 3,862,887 | 1/1975 | Bielski et al. | 201/27 X |
| 3,888,043 | 6/1975 | Child et al. | 48/209 X |
| 3,929,585 | 12/1975 | Grimmett | 201/2.5 |
| 3,954,425 | 5/1976 | Gunther | 55/73 X |
| 3,970,524 | 7/1976 | Funk | 201/29 X |
| 3,971,704 | 7/1976 | von Klenck et al. | 201/29 X |
| 3,989,811 | 11/1976 | Hill | 55/73 X |
| 4,117,786 | 10/1978 | Brose | 110/229 |
| 4,121,912 | 10/1978 | Barber et al. | 48/209 X |

FOREIGN PATENT DOCUMENTS

2422256 11/1974 Fed. Rep. of Germany ............ 201/2.5

Primary Examiner—Robert H. Spitzer
Attorney, Agent, or Firm—Michael J. Striker

[57] ABSTRACT

A pyrolysis reactor is operated by passing the waste products into a reactor provided with a heating unit; after completion of the pyrolysis passing the gaseous and vaporous products including suspended solids resulting from said pyrolysis into a partial oxidation zone wherein preheated air is added in an amount insufficient for complete combustion but sufficient to cause the exiting gas to have a temperature of at least 1000°, thereby causing decomposition of substantially all hydrocarbons present; then passing the partially oxidized gas through separate heat exchange means in contact, successively, with (1) the purified gas, (2) the air to be fed into the heating unit of the reactor and (3) with the air for said partial oxidation; then subjecting the partial oxidation gas to a purification; introducing air separately to said oxidation zone and heating means of the reactor; and passing the purified gas together with part of said added air into the heating unit of the reactor.

13 Claims, 1 Drawing Figure

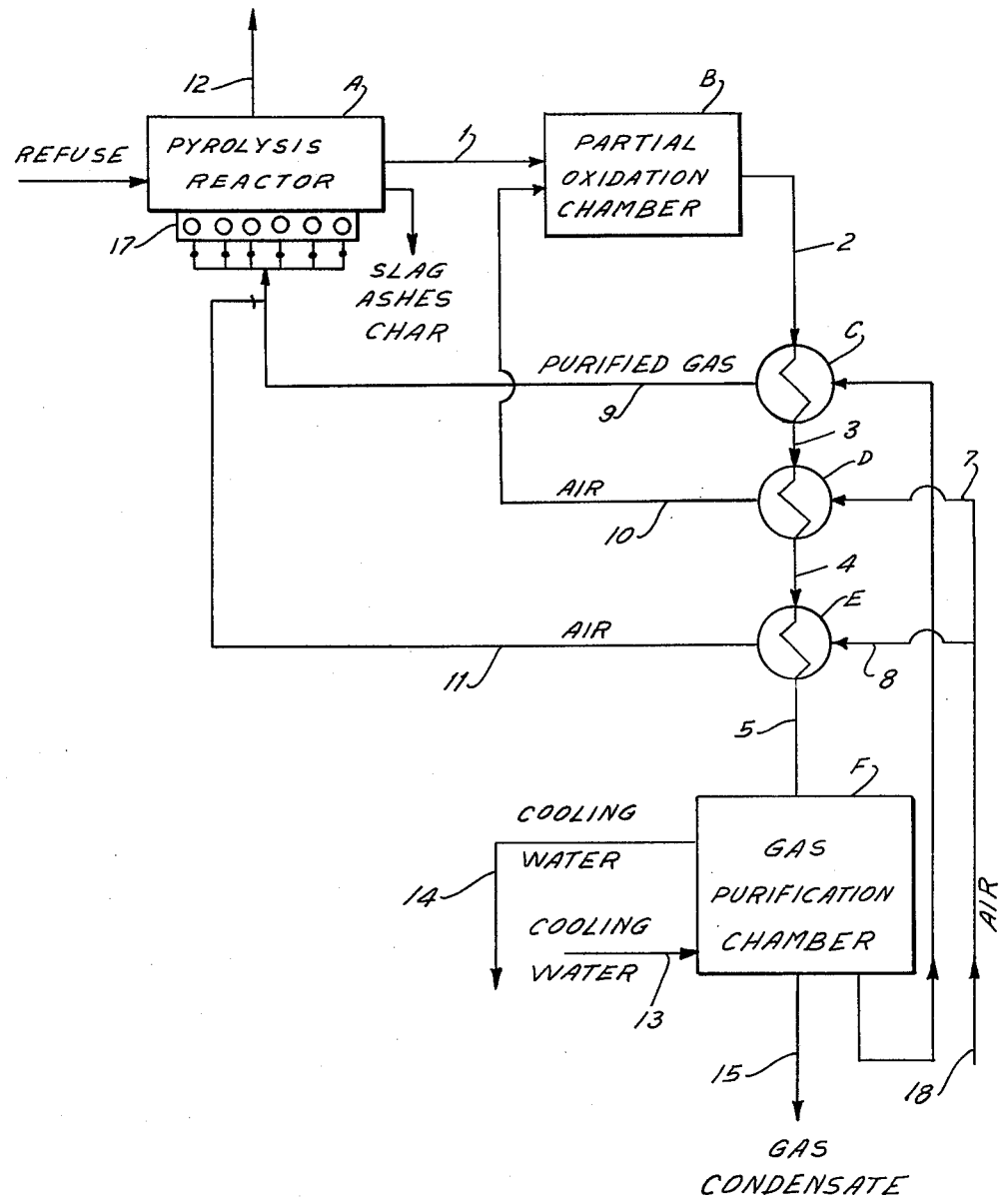

PROCESS FOR PURIFYING PYROLYSIS GASES

This invention relates to a process for the purification of low temperature carbonization and gasification gases of every type and sort and more particularly relates to a process for the purification of such gases which contain as a substantial portion thereof tars, high boiling oils and hydrocarbons, organic and inorganic sulfur and chlorine compounds.

The instant purification process is especially suitable for use in connection with the relatively small amounts of gas collected in the pyrolysis of home and industrial refuse which differ in composition, amount and value from the gaseous end products of coke production.

The working up of the pyrolysis gases derived in connection with the pyrolising of home and industrial refuse because of the very nature of the contaminants present therein cannot be economically carried out because of the high expenditures for the apparatus and operation which are required for refuse derived gas as compared to the very small amounts of utilizable by-products which can be recovered therefrom. This, as is well known, is even the case in connection with the gases produced in coke production.

It is extremely important for environmental purposes that the gases produced in the burning of refuse be purified without the requirement for large expenditures for equipment, energy and the like.

It is an object of the present invention to reduce the outlay for apparatus to be used in the treatment of pyrolysis gases and particularly the treatment of those gases derived from degasification and gasification reactions involving thermal decomposition.

Another object of the invention is to provide a substantially simplified process for the purification of degasification and gasification reaction gaseous end products.

Still another object of the invention is to provide an economically feasible and simple process for purification of the gases derived from pyrolysis of home and industrial waste products.

Yet another object of the invention is to provide an energy favorable purification process for treating thermal decomposition process gases.

These and other objects and advantages of the invention will become apparent from a consideration of the following discosure.

SUMMARY OF THE INVENTION

A pyrolysis reactor is operated by (a) passing the waste products into a pyrolysis reactor provided with an external heating unit;

(b) after completion of the pyrolysis passing the gaseous and vaporous products including suspended solids resulting from said pyrolysis into a partial oxidation zone wherein preheated air is added to the gaseous and vaporous products in an amount insufficient for complete combustion and sufficient to cause the formed gas to have a temperature of at least 1000° when leaving the oxidation zone, thereby causing decomposition of substantially all hydrocarbons present to CO, $H_2$, $CO_2$ and $H_2O$;

(c) then passing the partially oxidized gas through separate heat exchange means in contact, successively, with (1) the purified gas (below (d)), (2) the air to be fed into the external heating unit of the reactor and (3) in contact with the air for said partial oxidation, at least part of the sensible heat of said partial oxidation gas thus being utilized to preheat the oxidation air, heating air and heating gas;

(d) then subjecting the partial oxidation gas to a purification by adsorption or absorption of contaminants present in it;

(e) introducing air in separate conduits to said oxidation zone and said heating means of the reactor; and (f) passing the purified gas having a temperature of at least 200° C. together with part of said added air into the heating unit of the reactor, the said purified gas and added air being preheated in said heat exchangers (above (c)) prior to introduction or reintroduction into the process.

The partial oxidation results in a reaction end temperature preferably exceeding 1200° C. The pyrolysis crude gas is introduced into the partial oxidation preferably at a temperature which is greater than 350° C.

BRIEF DESCRIPTION OF THE DRAWING

The single FIGURE illustrates in a flow sheet an embodiment of the invention.

In accordance with the process of the invention the gas after its discharge from the pyrolysis process is first subjected to a treatment step for effecting coarse separation of the solid material therefrom and thereafter without first cooling the gas the treated gas is subjected to a partial oxidation utilizing therefor that quantity of pre-warmed air as will result in an exit or end temperature of at least 1000° C. and preferably more than 1200° C. in the reactor. The amount of air which is charged is insufficient for the complete combustion to take place. However, under the conditions of the process of the invention that insufficient amount of air together with the increase in the temperature in the reactor is sufficient to effect the thermal decomposition of substantially all of the hydrocarbons present to CO, $H_2$, $CO_2$ and $H_2O$. The operating pressure utilized in the process of the invention amounts to a pressure only slightly above or below atmospheric pressure so that the thermodynamic equilibrium results in the formation of only small amounts of methane and only traces of higher hydrocarbons. The gas composition especially the portion or fraction of hydrocarbons, can be maintained within a desired range of values, i.e. in a desired relationship by adjusting reaction end temperature and namely by utilizing a controlled amount of air or oxygen and namely an amount which is insufficient for complete combustion of the thermal decomposition end products present in the pyrolysis gas. The equilibrium for formation of hydrocarbons is so strongly temperature dependent that a change in the least degree in the temperature brings about a considerable displacement of the reaction equilibrium.

The gas discharged from the thermal decomposition reactor while it consists in the main only of $CO_2$, CO, $H_2$, $N_2$ and $H_2O$, also contains at this point of time all of the known and conventional toxic substances such as Cl and S in defined forms and in the main as HCl, $H_2S$ and COS. Provision is made for the removal of these latter substances in an after installed adsorptive or absorptive purifying stage utilizing the conventional techniques.

There is realized as a result of this combination of the partial oxidation with a classical purification process, a pyrolysis gas which in its final form represents an ideal and environmentally acceptable fuel. The amounts and analysis of this gas which is to be supplied to the pyrolysis process are in general so conditioned that the gases with minor variations or fluctuations suffice for providing the heat requirement for the pyrolysis process. The waste gas remaining after the combustion requires no further after treatment for heating the pyrolysis oven as all of the chemically toxic materials in the sense of officially acceptable air have already been removed from the gas prior to the combustion. Indispensable for this treatment of the pyrolysis gas is the most extensive recovery of the sensible heat which results from the incomplete combustion which alone can achieve an economic thermal splitting. To achieve this heat recovery, heat exchangers are installed in the system with the objective of recovering the sensible heat from the hot reaction mixture which is then utilized for heating up the air needed for the process and for further heating up the gas which has been washed or adsorptively freed of its toxic substances. In this way all of the sensible heat required for preheating the purified pyrolysis gas before charging it into the combustion, is recovered prior to its admission into the pyrolysis oven. The total or entire process is therefore carried out with only that heat load which is of necessity used up in obtaining an economically replaceable heat exchange surface by the temperature difference necessary for the heat exchange.

Based on the kind or type of material or refuse being burnt in the reactor and also the temperature relationship in the pyrolysis reactor, the hydrocarbons present in the pyrolysis crude gas can more or less be easily thermally split. In order to minimize any undesirable soot formation a certain amount of steam can be charged together with the air or with the pyrolysis crude gas added for the partial oxidation. On the thermodynamic grounds, with a higher content of hydrocarbons and also when there is an increased resistance to thermal decomposition, a higher yield of waste heat occurs. This waste heat can be recovered and then used for generating the desired amount of steam and can also be fed into a waste heat boiler installed in the heat exchange system after the cracking reactor.

In the purification of the pyrolysis crude gas according to the heretofore practiced methods, in all instances, there was derived a waste water fraction which is contaminated with phenol and cresol impurities. This did give rise to difficulties in purification of the water. It was necessary to carry out a water and also an oil scrubbing whereupon subsequently the separation of the water and oil had to be carried out. In these processes there existed therefore an oil contaminated waste water which likewise required considerable expenditures for its purification.

In the process of the invention for thermally treating pyrolysis gas there are no phenol products present and on the other hand, no oil washing is required. As a result the process herein materially reduces the water treatment problems. The economies realized in this regard, i.e. the water treatment, relative to the known processes essentially reduce the costs for equipment, materials, personnel etc.

The following example together with the attached drawing will further illustrate an embodiment of the process of the invention.

EXAMPLE

Ordinary domestic refuse in an amount of about 1 ton per hour was introduced in the pyrolysis reactor A in which it was subjected to the heat produced by an external heating unit consisting of a plurality of burners 17. The wall temperature of the reactor was about 800° C. The pyrolysis products at the exit of the reactor had a temperature of about 500° to 600° C. They consisted principally of a mixture of gases such as $CO_2$, $H_2$, $CH_4$, etc., tar oils, water vapor and similar products including suspended solids. The composition passing out of the reactor through duct 1 was therefore determined by weight only to include the following main components:

| | |
|---|---|
| C: | 172 kg/h |
| O: | 420 kg/h |
| H: | 58 kg/h |
| | 650 kg/h |

The temperature of the mass passing through duct 1 was about 500° C. or slightly higher.

The mass was then passed into the partial oxidation chamber 3 in which preheated air was added to the mass in an amount insufficient for complete combustion but sufficient to increase the temperature of the thus-formed gas at the exit from the oxidation chamber to about 1200° C.

The total amount of gas thus formed was determined as 1361 $Nm^3/h$. The composition of the gas was found to be as follows:

| | | |
|---|---|---|
| $CO_2$ | = | 7.93% by vol. |
| CO | = | 15.60% by vol. |
| $H_2$ | = | 21.16% by vol. |
| $N_2$ | = | 28.47% by vol. |
| $H_2O$ | = | 26.84% by vol. |
| | | 100.00% by vol. |

The gas at this temperature was then passed into a first heat exchanger C in which it yielded part of its sensible heat to the purified gas which was obtained as will be described below.

The gas after passing through the heat exchanger C then passed through a duct 3 and at this point its temperature had been reduced to about 895° C.

The gas now was passed into a heat exchanger unit D where it served to preheat part of the added air as will also be described below. When passing out of this second heat exchanger the gas still had a temperature of about 745° C. The gas then passed through another and final heat exchanger E where it acted to preheat another portion of the added fresh air. After passing out of this heat exchanger to duct 5 the gas had a temperature of about 235° C.

The gas now was subjected to a purification and cooling process in the purification chamber F. The purification may be done as conventional, as an absorption step by a potassium carbonate wash or a simple water scrubbing. Also methylpyrolidone may be used for this purpose. Alternatively an adsorptive cleaning by e.g. activated carbon or bog iron ore may be used. An amount of 9,912 kg/h was passed into the purification chamber. The cooling water was at room temperature. After circulating through the purification water the cooling water was withdrawn through duct 14 and now had a temperature of 40° C.

The purification of the gas involved principally a steam condensation. The total steam condensate passed out through the discharge duct 15 was 156 kg/h. The condensate was at a temperature of about 50° C.

Purified gas was obtained from the purification chamber in an amount of 1134 $Nm^3/h$. This gas was at a temperature of 50° C. The composition of the gas was found to be as follows:

$CO_2$ = 9.52% by vol.
$CO$ = 18.73% by vol.
$H_2$ = 25.39% by vol.
$N_2$ = 34.16% by vol.
$H_2O$ = 12.20% by vol.

This purified gas was then passed through the duct 6 and heat exchanger C, as described above, and thereafter at a temperature in duct 9 of 500° C. This gas was then passed into the heating unit 17 of the pyrolysis reactor. The heating unit in this embodiment consisted of a plurality of burners as indicated in the drawing.

The required fresh air was introduced into the process through duct 18. The duct then was branched into two separate passages 7 and 8. The air, when introduced, was at room temperature. The amount of air passed through the branch 7 was 491 $Nm^3/h$, while the amount passed through the duct 8 was 1430 $Nm^3/h$. After passing through the heat exchanger C the air received from the duct 7 had a temperature increase to about 500° C. A similar temperature increase was imparted in the heat exchanger E to the air received from the duct 8 and passed on through duct 11.

The air through duct 10 was then passed into the oxidation chamber to effect the partial oxidation of the decomposed pyrolysis products. The air passing through duct 11 was fed together with the purified gas into the burner 17 of the reactor. In the pyrolysis reactor flue gases were formed in an amount of 2314 $Nm^3/h$ which has about the following composition:

$CO_2$ = 13.85% by vol.
$O_2$ = 2.16% by vol.
$N_2$ = 65.56% by vol.
$H_2O$ = 18.43% by vol.

These flue gases were discharged through stack 12 into the atmosphere.

Without further analysis, the foregoing will so fully reveal the gist of the present invention that others can by applying current knowledge readily adapt it for various applications without omitting features that, from a standpoint of prior art, fairly constitute essential characteristics of the generic or specific aspects of this invention.

What is claimed as new and desired to be protected by Letters Patent is set forth in the appended claims:

1. A process for operating a pyrolysis reactor for waste products, the said process comprising
   (a) passing the waste products into a pyrolysis reactor provided with a separate heating means;
   (b) after completion of the pyrolysis passing the gaseous and vaporous products including suspended solids resulting from said pyrolysis into a partial oxidation zone wherein preheated air is added to the gaseous and vaporous products in an amount insufficient for complete combustion and sufficient to cause the formed gas to have a temperature of at least 1000° when leaving the oxidation zone, thereby causing decomposition of substantially all hydrocarbons present to CO, $H_2$, $CO_2$ and $H_2O$;
   (c) then passing the formed gas through separate heat exchange means in contact, successively, with (1) the purified gas (below (d)), (2) the air to be fed into the external heating unit of the reactor and (3) in contact with the air for said partial oxidation, at least part of the sensible heat of said partial oxidation gas thus being utilized to preheat the oxidation air, heating air and heating gas;
   (d) then subjecting the gas to a purification by adsorption or absorption of contaminants present in it;
   (e) introducing air in separate conduits to said oxidation zone and said heating means of the reactor; and
   (f) passing the purified gas having a temperature of at least 200° C. together with part of said added air into said heating means of the reactor, the said purified gas and added air being preheated in said heat exchangers (above c)) prior to introduction or reintroduction as fuel gas into the process.

2. Process according to claim 1, which comprises conducting the partial oxidation with a reaction end temperature of at least 1200° C.

3. Process according to claim 1, which comprises introducing the pyrolysis gas into the partial oxidation at a temperature of at least 350° C.

4. Process according to claim 1, wherein the purified pyrolysis gas is heated up to at least 250° C. using the waste heat of the process prior to its introduction into the heating unit of the pyrolysis reactor.

5. Process according to claim 1, wherein the purified pyrolysis gas is heated up to at least 400° C. using the waste heat of the process prior to its introduction into the heating unit of the pyrolysis reactor.

6. Process according to claim 1, which comprises carrying out the pyrolysis in a rotating tube having a wall temperature above 400° C.

7. Process as defined in claim 6 wherein the rotary tube is heated by externally arranged burners which individually or in groups are automatically controlled by sensors determining said wall temperature and wherein the fuel to air ratio for said burners is automatically adjusted in accord with the oxygen contents of the flue gases of the individual burners or groups of burners or of the total fuel gas so as to compensate for variation in the calorific value of the pyrolysis gas.

8. Process as defined in claim 1, which comprises carrying out the pyrolysis in a rotating tube having a wall temperature above 600° C.

9. Process according to claim 1, wherein the purification is affected by purging the thermally treated pyrolysis crude gas before the combustion of chemically toxic substances including Cl, S and F containing compounds.

10. Process according to claim 1 wherein at least part of the purification is carried out by steam condensation.

11. Process according to claim 1 wherein steam is added together with said preheated air into the partial oxidation zone (claim 1 step (b)) in order to minimize soot formation.

12. Process according to claim 11 wherein part of the heat of the partially oxidized gas is used for generating said steam.

13. Process of claim 1 wherein the heating means are provided externally of the reactor so as to transmit heat through the walls of the reactor.

* * * * *